United States Patent [19]

Merchant et al.

[11] Patent Number: 5,408,463
[45] Date of Patent: Apr. 18, 1995

[54] RESYNCHRONIZATION OF ASYNCHRONOUS TRANSFER MODE (ATM) SWITCH FABRIC

[75] Inventors: Shahrukh S. Merchant, Londonderry, N.H.; Mark A. Pashan, Wheaton, Ill.; Hiromi Ueda, Yokohama; Hitoshi Uematsu, Yokosuka, both of Japan

[73] Assignee: AT&T Corp., Murray Hill, N.J.

[21] Appl. No.: 192,753

[22] Filed: Feb. 7, 1994

Related U.S. Application Data

[63] Continuation of Ser. No. 997,479, Dec. 28, 1992, abandoned.

[51] Int. Cl.$^6$ ............................................. H04J 3/06
[52] U.S. Cl. ................................. 370/16; 370/100.1; 340/825.21
[58] Field of Search ............... 370/16, 60, 60.1, 94.1, 370/100.1, 94.2, 58.1; 340/825.21; 379/221

[56] References Cited

U.S. PATENT DOCUMENTS

| | | | |
|---|---|---|---|
| 4,536,870 | 8/1985 | Bovo et al. | 370/16 |
| 4,862,454 | 8/1989 | Dias et al. | 370/60 |
| 4,932,020 | 6/1990 | Pashan et al. | 370/14 |
| 4,962,499 | 10/1990 | Senema | 370/94.1 |
| 5,153,578 | 12/1992 | Izawa et al. | 370/60.1 |

OTHER PUBLICATIONS

Co-pending United States Patent Application Ser. No. 07/739,928, filed Aug. 2, 1991 (M. A. Pashan et al. 3-9).

*Primary Examiner*—Douglas W. Olms
*Assistant Examiner*—Chau T. Nguyen
*Attorney, Agent, or Firm*—Thomas Stafford

[57] ABSTRACT

In a duplicate active-standby memory unit arrangement, a resynchronization initiation determination is made on a cell-interval-by-cell-interval basis based on the equality of cell contents of corresponding queues in the active and standby memory units. If an inequality of the cell contents of the corresponding queues in the active and standby memory units occurs during any cell interval, resynchronization may be initiated. In an exemplary embodiment of the invention, the lengths of data in corresponding queues, i.e., the number of cells stored in the corresponding queues, in the active and standby memory units are compared on a cell-interval-by-cell-interval basis. If the number of cells stored in any of the queues is different than the number of cells its corresponding queue in the other of the memory units during any cell interval, resynchronization of the memory units is initiated. In another embodiment of the invention, the outputs of corresponding queues in the active memory unit and the standby memory unit are compared on a cell-interval-by-cell-interval basis. If the results of the comparison indicates that any one or more of the queue outputs in one of the memory units is different from the output of the corresponding queue in the other memory unit, resynchronization is initiated. Robustness of the latter comparison algorithm is enchanced by restricting the comparisons to cell intervals during which the queue outputs in the active and standby memory units do not both include idle cells. Additionally, robustness of the resynchronization initiation is further enhanced by simultaneously employing both the comparison of cell length in the queues and the comparison of the queue output contents to detect when to initiate resynchronization.

2 Claims, 4 Drawing Sheets

RESYNCHRONIZATION OF ASYNCHRONOUS TRANSFER MODE (ATM) SWITCH FABRIC

This application is a continuation of application Ser. No. 07/997479, filed Dec. 28, 1992, now abandoned.

TECHNICAL FIELD

This invention relates to synchronization of duplicated, i.e., active-standby, buffer memory units and, more particularly, to an arrangement for initiating resynchronization of the memory units.

BACKGROUND OF THE INVENTION

In certain system arrangements duplicated buffer memory units are employed in an active-standby configuration to reduce so-called "down time" in the presence of a failure and, thereby, improve system reliability. In such duplicated memory system arrangements proper system operation requires that the contents of each of the memory units be identical. Prior arrangements are known in which synchronization of such duplicated memory units is realized. (See, for example, U.S. patent application Ser. No. 07/739,928, filed Aug. 2, 1991 now U.S. Pat No. 5,278,969 issued Jan. 11, 1994.) It should be noted that ATM transmission of data is on a cell-by-cell basis wherein each cell comprises a fixed length packet. Thus, in the ATM context, the terms cell and packet are interchangeable. In the noted prior duplicated memory arrangement, a plurality of queues is employed to store cells, with each of the queues being associated on a one-to-one basis with either inputs or outputs of the memory unit. Synchronization of the active and standby memory units is realized in this prior arrangement by employing a queue length counter with each queue and observing when all of the counters have reached zero count at least once. Although this prior arrangement will indicate that the duplicated memories are in synchronization at some particular time after synchronization has been initiated, it does not determine when or how to initiate resynchronization. Once synchronization has been obtained, if the contents of the corresponding queues in the active and standby memories become different during any cell interval, problems can arise.

SUMMARY OF THE INVENTION

The problems of prior duplicated memory unit arrangements are overcome, in accordance with the principles of the invention, by making a resynchronization initiation determination on a cell-interval-by- cell-interval basis based on the equality of cell contents of corresponding queues in the active and standby memory units. If an inequality of the cell contents of the corresponding queues in the active and standby memory units occurs during any cell interval, resynchronization may be initiated.

In an exemplary embodiment of the invention, the lengths of data in corresponding queues, i.e., the number of cells stored in the corresponding queues, in the active and standby memory units are compared on a cell-interval-by-cell-interval basis. If the number of cells stored in any of the queues is different than the number of cells in its corresponding queue in the other of the memory units during any cell interval, resynchronization of the memory units is initiated.

In another embodiment of the invention, the outputs of corresponding queues in the active memory unit and the standby memory unit are compared on a cell-interval-by-cell-interval basis. If the results of the comparison indicates that any one or more of the queue outputs in one of the memory units is different from the output of the corresponding queue in the other memory unit, resynchronization is initiated.

Robustness of the latter comparison algorithm is enhanced, in accordance with an aspect of the invention, by restricting the comparisons to cell intervals during which the queue outputs in the active and standby memory units do not both include idle cells.

Additionally, robustness of the resynchronization initiation is further enhanced by simultaneously employing both the comparison of cell length in the queues and the comparison of the queue output contents to detect when to initiate resynchronization.

DETAILED DESCRIPTION

Figure 1:
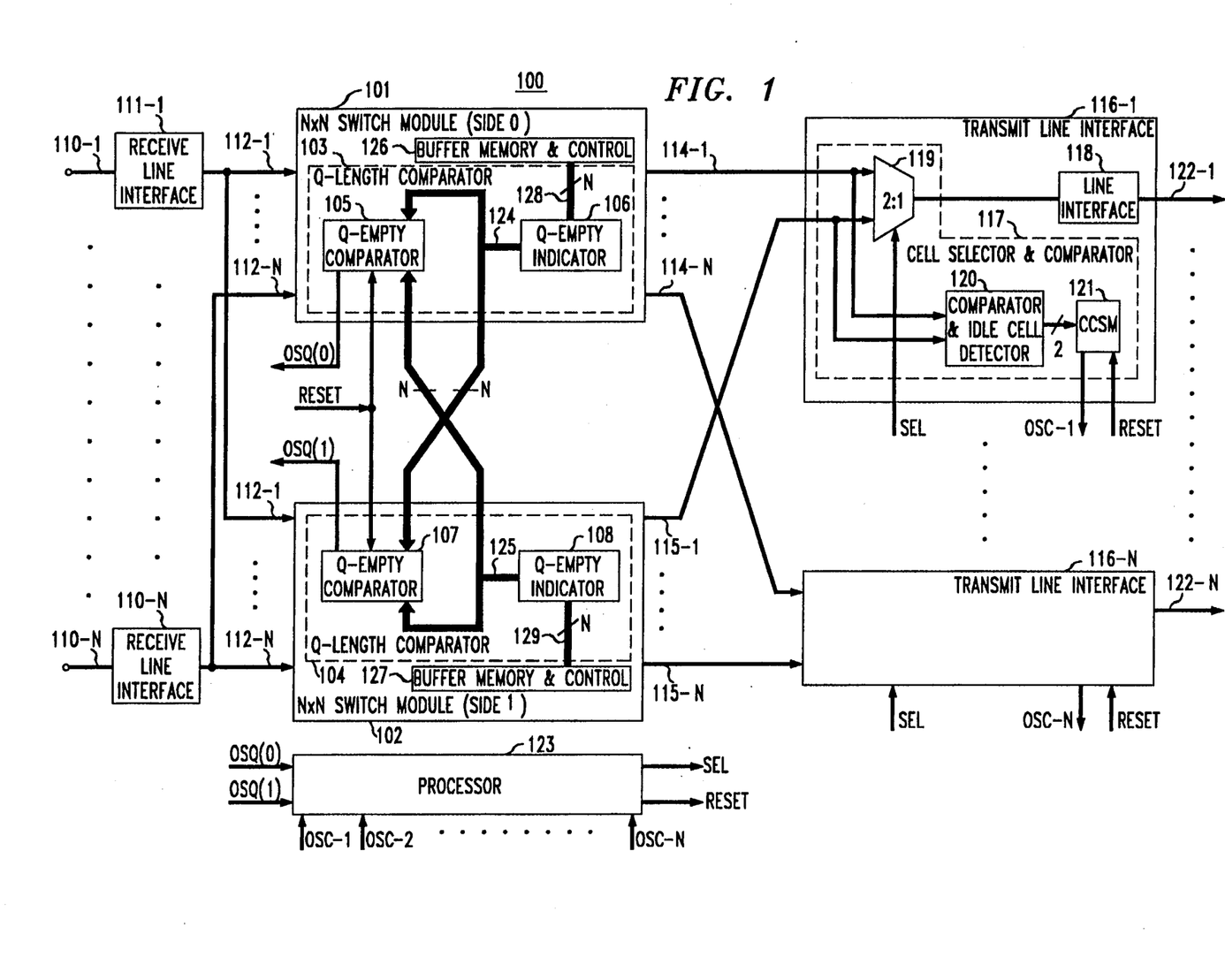
FIG. 1 shows, in simplified block diagram form, an NxN switch arrangement including an embodiment of the invention.

FIG. 1 shows, in simplified bock diagram form, an exemplary duplicated NxN switch arrangement 100, including an embodiment of the invention. Switch 100 is particularly suited for use in Asynchronous Transfer Mode (ATM) switching and/or transmission systems. Such a system may constitute either a stand-alone switch 100 or a portion of a switch made up of a plurality of such switches 100. Switch 100 includes a duplicate pair of NxN switch modules 101 and 102 which are arranged to operate in active-standby modes for fault-tolerance purposes. As indicated above, such duplicated switch arrangements are known. See, for example, co-pending U.S. patent application Ser. No. 07/739,928 U.S. Pat. No. 5,278,969, cited above.

Switch modules 101 and 102 include buffer memory and control units 126 and 127, respectively. Each of buffer memory and control units 126 and 127 includes a plurality of N queues (not shown) which are controlled by a controller (not shown) for storing incoming cells from the plurality of inputs 112-1 through 112-N and controllably supplying them to outputs 114-1 through 114-N. Such buffer memory and control units are well known in the art. Switch modules 101 and 102 also include queue (Q)-length comparators 103 and 104, respectively. Q-length comparator 103 includes queue (Q)-empty comparator 105 and queue (Q)-empty indicator 106. Similarly, Q-length comparator 104 includes Q-empty comparator 107 and Q-empty indicator 108.

Received digital signals are supplied via inputs 110-1 through 110-N and receive line interfaces 111-1 through 111-N to inputs 112-1 through 112-N, respectively, of switch modules 101 and 102. Each of receive line interface units 111 perform functions such as clock recovery, framing and other well known functions commonly associated with digital receive line interface units. In addition, for ATM systems, receive line interface units 111 also perform functions such as ATM cell delineation and the like which are also well known for such ATM systems. In an ATM system, the received ATM cell stream contains a continuous stream of ATM cells which, in general include idle cells and non-idle cells. For purposes of this explanation of the embodiment of FIG. 1, it is assumed that the incoming ATM line rate is 155.52 Mb/s, which is known as the STM-1 rate, although the invention is not limited in this regard. The ATM cell stream is typically accompanied by a BIT/-WORD Clock which, depending on the particular implementation may be a clock at the bit rate of the ATM cell stream if the implementation is a serial one or, more typically, a sub-multiple of the ATM cell stream bit rate if data are carded on a parallel bus. In addition, a Cell Clock is present, which provides information that identifies the boundaries of the fixed length cells. Those skilled in the art will know how to employ such clocks in an ATM system employing the invention. The outputs of receive line interface units 111-1 through 111-N are dual fed to inputs 112-1 through 112-N of each of switch modules 101 and 102 and, therein, to the N queues in buffer memory and control units 126 and 127, respectively. Switch modules 101 and 102, which are also referred to as side 0 and side 1 switch modules, respectively, are redundant with each other, i.e., their internal states and all of their N queues should be the same. That is to say, cell contents of the N queues in each of buffer memory and control units 126 and 127 of switch modules 101 and 102 respectively, should be identical.

It is noted that switch modules 101 and 102 operate on all N inputs simultaneously to provide N outputs, namely, outputs 114-1 through 114-N for switch module 101, and outputs 115-1 through 115-N for switch module 102. These outputs are supplied in pairs to transmit line interface units 116-1 through 116-N. Thus, it is seen that output 114-1 from switch module 101 and output 115-1 from switch module 102 are supplied to transmit line interface 116-1 while output 114-N from switch module 101 and output 115-N from switch module 102 are supplied to transmit line interface 116-N. Only transmit line interface 116-1 will be described in detail, all other of the transmit line interface units 116 being identical in structure and operation. Thus, output 114-1 from switch module 101 and output 115-1 from switch module 102 are supplied to cell selector and comparator 117 of transmit line interface 116-1 and, therein, to inputs of 2:1 selector 119 and cell comparator and idle cell detector 120. The 2:1 selector 119 is responsive to a select control signal (SEL) from processor 123 to select output 114-1 or 115-1 according to whether side 0 switch module 101 or side 1 switch module 102, respectively, has been designated as the active switch module. The output from 2:1 selector 119 is further processed via line interface 118 prior to transmission on output 122-1. Line interface 118 performs further processing related to formatting and timing of the digital signal for transmission in well-known fashion. Outputs from cell comparator and idle cell detector 120 are processed by cell comparator state machine (CCSM) 121 to determine whether or not there is an out-of-sync comparison. If so, an out-of-sync signal OSC-1 is supplied to processor 123. A reset signal is supplied from processor 123 as required to reset CCSM 121 to its in-sync condition.

As stated before, it is desirable during normal operation of switch 100, that side 0 switch module 101 and side 1 switch module 102 constantly be in-synchronization. The detection of an out-of-synchronization condition then requires, in accordance with the principles of the invention, that during each cell interval, the complete contents of each of the corresponding N queues in side 0 switch module 101 and side 1 switch module 102 be compared for equality. Since there may be hundreds of queues in each of the switch modules 101 and 102, and each of the queues having the capacity to store several thousand cells, with each cell containing hundreds of bits, the direct comparison of the contents of these queues at every cell interval would be excessively complex and expensive.

Among the central elements of this invention are the techniques and arrangements by which the equality of the queues of switch modules 101 and 102 is indirectly determined in a manner far simpler to implement than the direct comparison arrangement alluded to above. Two techniques and arrangements, in accordance with the principles of the invention, are described below. Either of which may be used individually or for more robust performance, together, to effect initiation of resynchronization. Although two specific examples of these techniques and arrangements are described below it will be apparent to those skilled in the art that the principles of the invention embodied therein may be extended to other equivalent apparatus and techniques.

One exemplary embodiment of the principles of the invention is realized in side 0 switch module 101 and side 1 switch module 102 by employing Q-length comparators 103 and 104, respectively. Q-length comparator 103 includes the combination of Q-empty comparator 105 and Q-empty indicator 106, and Q-length comparator 104 includes the combination of Q-empty comparator 107 and Q-empty indicator 108. Since the apparatus and operation of Q-length comparators 103 and 104 are identical only the operation of Q-length comparator 103 in side 0 switch module 101 will be described. Q-empty indicator 106 generates N binary Q-empty indicator signals, each of which indicates whether or not a corresponding one of the N queues in the buffer memory in switch module 101 is empty. That is to say, each Q-empty indicator signal indicates whether or not the corresponding queue has cells therein pending transmission as an output. The N Q-empty indicator signals are supplied via N lines 124 to Q-empty comparator 105 in switch module 101 and to Q-empty comparator 107 in switch module 102. Similarly, the N Q-empty indicator signals from Q-empty indicator 108 in switch module 102 are supplied via N lines 125 to Q-empty comparator 107 and to Q-empty comparator 105 in switch module 101. These Q-empty indicator signals are readily obtained from known queue-control circuitry (not shown) that manages the queues within each of buffer memory and control units 126 and 127 of switch modules 101 and 102, respectively. By way of example, co-pending application Ser. No. 07/739,928, cited above, employs a queue length counter to determine when a corresponding queue is empty, i.e., when a count of zero (0) cells is obtained. The N Q-empty indicator signals supplied to Q-empty comparator 105 from Q-empty indicator 106 and Q-empty indicator 108 are compared on a pair-wise basis.

At each cell interval, Q-empty comparator 105 performs an N-wise comparison of the pairs of N Q-empty indicator signals. An inequality of any one or more i.e., at least one in the N pairs of Q-empty indicator signals, indicates that switch module 101 and switch module 102 are out-of-synchronization and this indication is provided by an out-of-synchronization (OSQ (0)) signal from Q-empty comparator 105. A similar OSQ (1) signal would be supplied from Q-empty comparator 107. These OSQ (0) and OQS (1) signals are supplied to processor 123.

Figure 2:
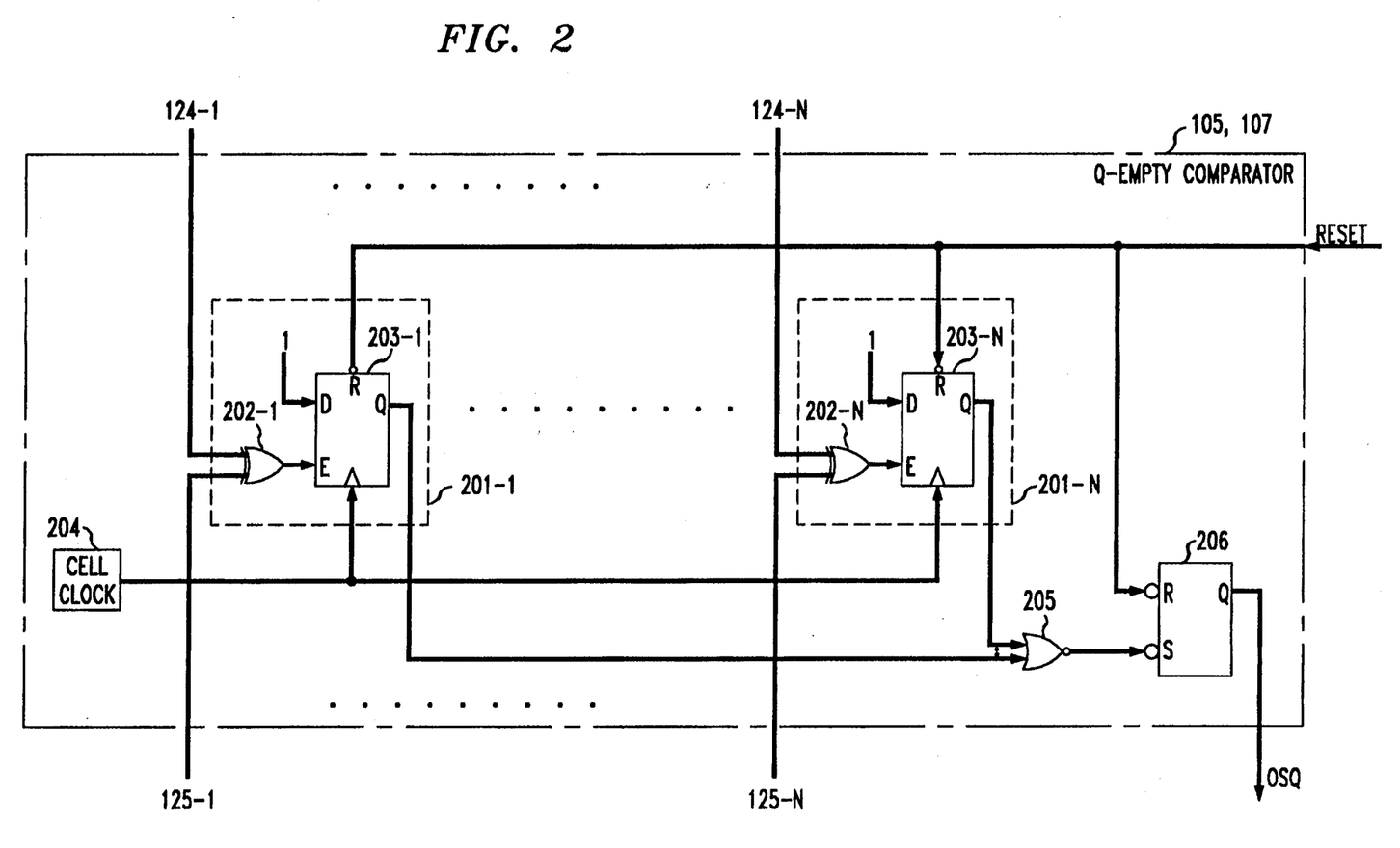
FIG. 2 shows, in simplified block diagram form, details of the queue (Q)-empty comparator employed in the switch modules of FIG. 1.

FIG. 2 shows one possible implementation of Q-empty comparators 105 and 107 of FIG. 1. The Q-empty comparator includes comparator blocks 201-1 through 201-N, one for each pair of Q-empty indicators 124-1, 125-1 through 124-N, 125-N, respectively. An output is supplied from each of comparator blocks 201-1 through 201-N to NOR-gate 205. Since the apparatus and operation of comparator blocks 201-1 through 201-N are identical, only comparator 201-1 will be described in detail. It is noted that either Q-empty indicator 124-1 or 125-1 is active in this example when it is a logical 1 which indicates that corresponding queue is empty. Q-empty indicators 124-1 and 125-1 are supplied to exclusive OR-gate 202-1. Exclusive OR-gate 202-1 generates at its output a logical 1 signal when Q-empty indicators 124-1 and 125-1 are not equal. At each cell interval, identified by cell clock 204, flip-flop 203-1 latches the state of the output of exclusive OR-gate 202-1. Cell clock 204 may be derived in any number of known ways. Flip-flop 203-1 is a D-type flip-flop which operates as follows: if its enable (E) input is active (logic 1), when it is clocked by cell clock, then the input to data (D) input appears at the output (Q); otherwise, the output (Q) remains unchanged; if the reset input (R) is active (logic 0), the output (Q) is set to logic 0 regardless of the states of the (D) and (E) inputs. Since Q-empty indicators 124-1 and 125-1 are in synchronization with the output from cell clock 204, the output (Q) from flip-flop 203-1 will become active upon the first mismatch between Q-empty indicators 124-1 and 125-1 and will stay in the active state until reset by an active reset (logic 0) signal supplied from processor 123 (FIG. 1). NOR-gate 205 combines the N output indications from comparator stages 201-1 through 201-N. The output of the combination from NOR-gate 205 is supplied to latch 206 which is set to an active state if any of the N pairs of Q-empty indicator signals 124, 125 indicates a mismatch at any cell time. Latch 206 supplies an active (logic 1) output OSQ to processor 123 until it is reset in response to an active reset signal from processor 123.

It is well understood in the domain of queuing that in a stable queuing system with random signal arrivals, each queue must periodically be empty. Thus, an inequality in the length of corresponding queues will manifest itself when the queue having the shorter length, i.e., lower number of cells therein, is emptied and the queue having the longer length, i.e., larger number of cells therein, has one or more cells remaining; at that instant, Q-empty comparator 105 will detect the inequality. Since one of the primary phenomena that could cause switch modules 101 and 102 to go out-of-synchronization is the unwanted deletion or addition of a cell (sometimes referred to as a "dropped cell" or "mis-inserted cell", respectively) into one or more of the queues in either switch module 101 or 102, this technique effectively and simply detects out-of-synchronization caused by either of these states, in accordance with the principles of the invention.

Another apparatus and technique for detecting when to initiate resynchronization is realized, in accordance with the invention, by the combination of cell comparator and idle cell detector 120 and cell comparator state machine (CCSM) 121 in each of transmit line interface units 116-1 through 116-N. At each cell interval, cell comparator and idle cell detector 120 compares the contents of the cell on output 114-1 from switch module 101 to the contents of the cell on output 115-1 from switch module 102. If any bit in these cells indicates a difference in the contents of the cell, cell comparator and idle cell detector 120 supplies an output indicating this state to CCSM 121. For example, the output from cell comparator and idle cell detector 120 could indicate one of four comparison states, viz, whether the cells were equal and idle, whether the cells were equal and non-idle, whether the cells differed in one (1) bit position or whether the cells differed in more than one (1) bit position. It is noted that idle cell detection is realized in a known fashion by comparing the received cell header to an expected idle cell pattern. For example, an idle cell has a distinct header as defined in CCITT Recommendation I.361 entitled "B-ISDN ATM Layer Specification". CCSM 121 processes the supplied indication in a predefined manner, e.g., CCSM 121 could wait for a few consecutive multiplebit mismatches between the cells prior to indicating an out-of-synchronization state, since a single-bit mismatch may be indicative of only a random bit error. When an out-of-synchronization state is declared, CCSM 121 supplies an out-of-sync indication signal OSC-1 to processor 123. Similarly, CCSM 121 could wait for several consecutive matches of cells prior to indicating a return to the insynchronization state. Additionally, the performance of CCSM 121 can be improved considerably by having it ignore the occurrence of idle cells on both inputs to comparator and idle cell detector 120. This is important because under low traffic conditions, the number of idle cells may be so large that they could otherwise falsely indicate an in-synchronization state.

Figure 3:
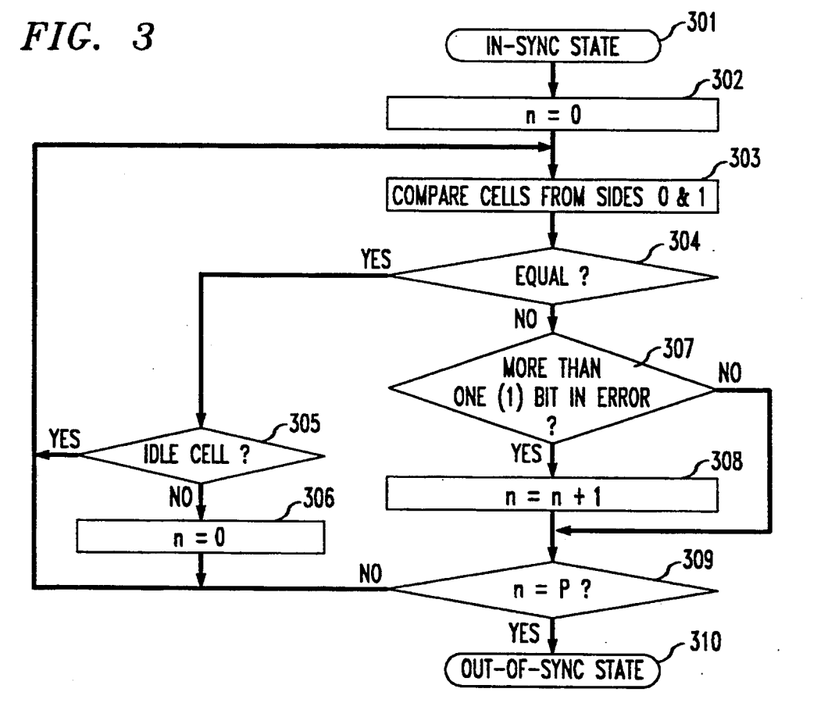
FIG. 3 is a flow chart illustrating the operation of the cell comparator state machines (CCMS) of FGI. 1 for determining an "out-of-sync" condition when starting from an "in-sync" condition.

FIG. 3 shows a flow chart illustrating one example of the operation of CCSM 121 when in an in-synchronization state and going to an out-of-synchronization state. Thus, it is assumed that the operation of CCSM 121 begins in step 301 in an in-sync state. Thereafter, step 302 sets the number of mismatches (n) of cells from switch modules 101 and 102 to n=0. Step 303 compares the bits in the cells from modules 101 and 102. Step 304 determines whether or not the cells are equal. If the test result in step 304 is yes, step 305 tests to determine whether or not the cells are idle cells. This determination is readily obtained in known fashion from the contents of the cell. If the test result is yes, control is returned to step 303. If the test result in step 305 is no, the cells are equal and non-idle, step 306 sets n=0 and control is returned to step 303. If the test result in step 304 is no, step 307 tests to determine whether there was more than one (1) bit in error. If the test result in step 307 is yes, step 308 increments n by 1, i.e., sets n=n+1. If the test result in step 307 is no, control is passed to step 309. Step 309 tests to determine if n equals a predetermined number P of consecutive cells that are unequal from modules 101 and 102, again discounting equal idle cells. If the test result in step 309 is no, control is returned to step 303. If the test result in step 309 is yes, P consecutive mismatches have been detected and an out-of-synchronization state is declared via step 3 10 and the OSC-1 signal is supplied to processor 123 (FIG. 1). The parameter P may be selected based on the performance requirements and characteristics of the system, but would generally be a small value, on the order of one (1) or two (2) cells. It is noted that those skilled in the art may employ alternative algorithms for determining the out-of sync condition without deviating from the essence and scope of this aspect of the invention.

Figure 4:
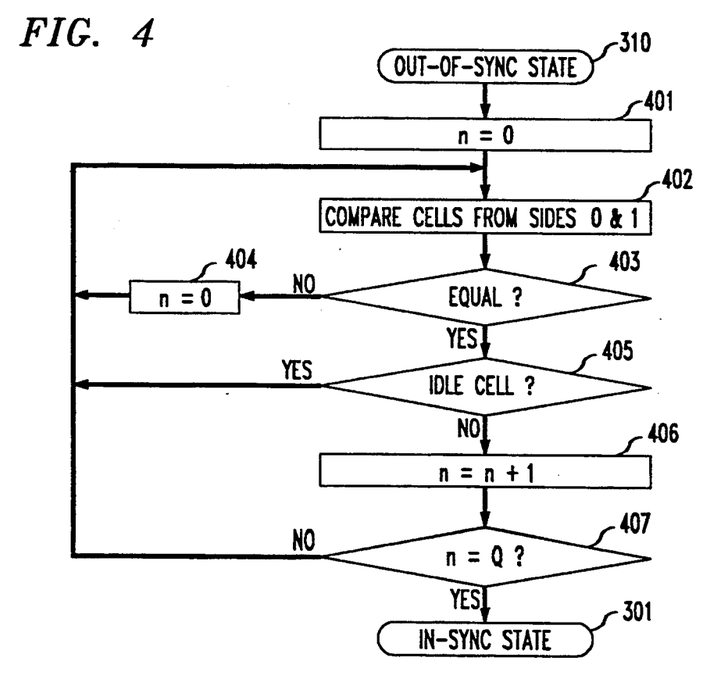
FIG. 4 is a flow chart illustrating the operation of the cell comparator state machines of FIG. 1 for determining an "in-sync" condition when starting from an "out-of-sync" condition.

FIG. 4 is a flow chart illustrating the operation of CCSM 121 when in an out-of-sync state and going towards an in-sync state. The process is entered via step 310, i.e., out-of-sync. Thereafter, step 401 sets the cell count to n=0. Step 402 compares cells from switch modules 101 and 102. Then, step 403 determines if the contents of the cells are equal. If the test result is no, step 404 sets n=0 and returns control to step 402. If the test result of step 403 is yes, the contents of the cells are equal and step 405 determines whether or not they are idle cells. If the test result is yes, control is returned to step 402. If the test result in step 405 is no, step 406 increments the cell count n by 1, i.e., sets n=n+1. Then, step 407 tests to determine if the cell count equals a predetermined number Q of consecutive cells from switch module 101 and switch module 102 that are equal. If the test result is no, control is returned to step 402. If the test result in step 407 is yes, an in-sync state 301 is declared. The parameter Q may also be selected based on the performance requirements and characteristics of the particular system, but would generally be on the order of several cells and greater than the parameter P.

Out-of-sync indicators OSQ (0) from switch module 101, OSQ (1) from switch module 102 and out-of-sync indicators OSC-1 through OSC-N from transmit line interfaces 116-1 through 116-N are supplied to processor 123 of FIG. 1. It is noted that all of these out-of-synchronization indicator signals are latched and, therefore, there is no need for processor 123 to respond within any one cell interval. Any one of the out-of-synchronization indicator signals being active indicates that switch modules 101 and 102 are out-of-synchronization, but processor 123 may implement any one of a number of approaches to making an out-of-synchronization determination. For example, processor 123 may first reset Q-empty comparators 105 and 107 in switch modules 101 and 102, respectively, and each CCMS 121 in transmit line interfaces 116-1 through 116-N and verify that an out-of-synchronization condition reappears. Once processor 123 has verified that switch modules 101 and 102 are out-of-synchronization, it will initiate procedures to resynchronize them. One example of a synchronization technique which may advantageously be employed is described in U.S. patent application Ser. 07/739,928, cited above. The particular procedure used in processor 123 could depend on which one or more out-of-synchronization indicator signals have been activated. Once switch modules 101 and 102 have been resynchronized, processor 123 activates the reset signal to reset Q-empty comparators 105 and 107 and all of the CCSMs 121 in transmit line interfaces 116-1 through 116-N and is then ready to detect the next occurrence of an out-of- synchronization condition to initiate resynchronization of switch modules 101 and 102.

The apparatus and concepts described above may be extended, in accordance with the principles of the invention, to multi-stage switches. For purposes of this description, multi-stage switches are assumed to have the following additional characteristics that the single stage switch 100 of FIG. 1 does not: they may be comprised of two or more cascaded or networked switch stages comprising duplicated switch modules, each of the switch modules has a set of queues associated with it and each such switch stage may be cross-coupled to a previous switch stage so that they are in so-called "separate protection groups", i.e., the side 0 switch module of stage 2 switch will receive inputs from both side 0 and side 1 switch modules of stage 1 and will select one of the two.

Figure 5:
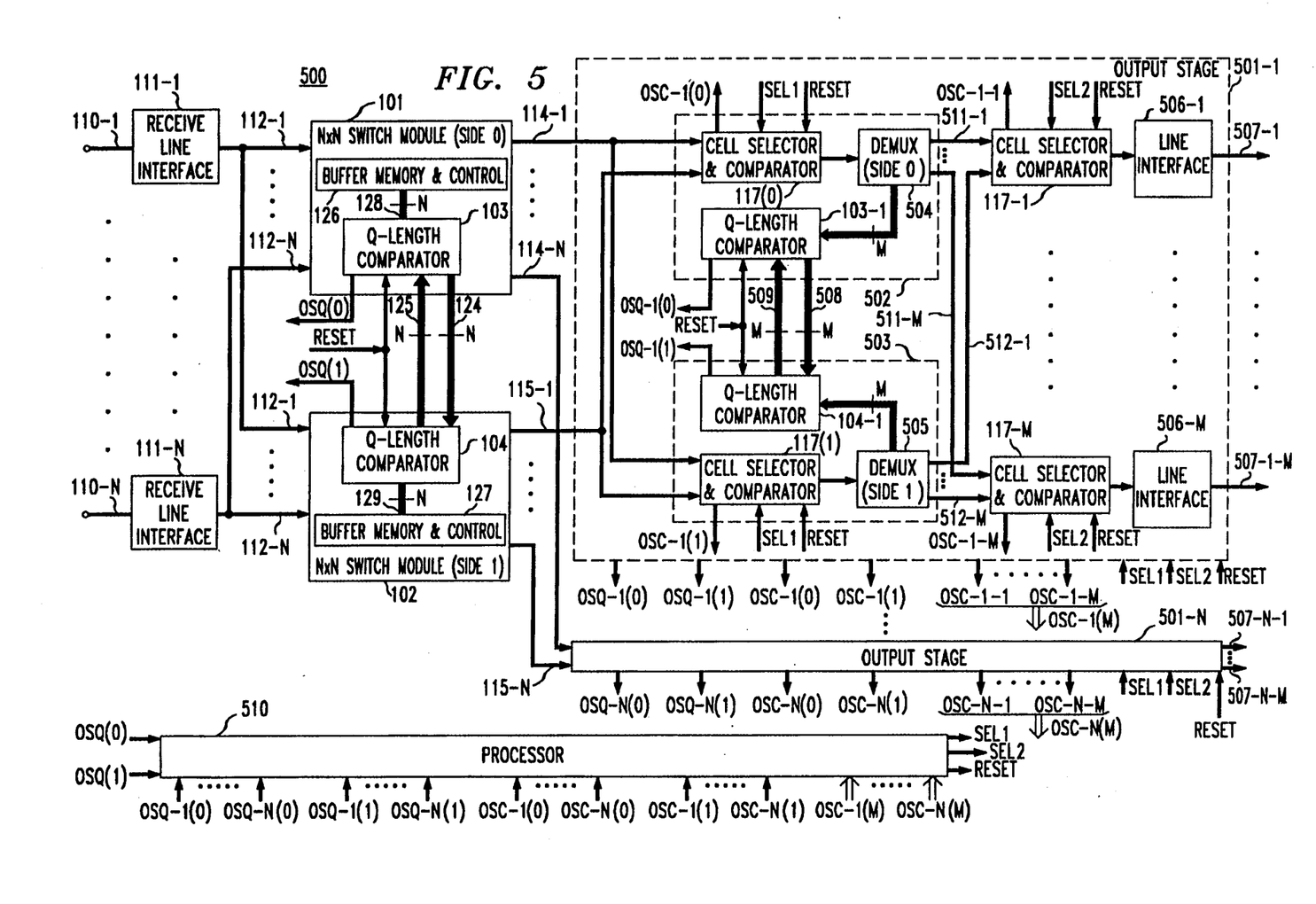
FIG. 5 shows, in simplified block diagram form, a multi-stage switch arrangement including an embodiment of the invention.

FIG. 5 shows, in simplied block diagram form, one embodiment of a multi-stage switch 500, including the invention. In this example, a first stage of the switch 500 includes NxN switch modules 101 and 102 including Q-length comparators 103 and 104, respectively, which are identical in structure and operation to those described above in relationship to FIG. 1. A second stage of the switch 500 comprises output stages 501-1 through 501-N which are identical. Only output stage 501-1 will be described in detail. Specifically, output stage 501-1 includes a side 0 demultiplexer (DEMUX) stage 502 and a side 1 demultiplexer (DEMUX) stage 503. Stage 502 includes cell selector and comparator 117 (0), side 0 DEMUX 504 and Q-length comparator 103-1. Similarly, demultiplexer stage 504 includes cell selector and comparator 117 (1), side 1 DEMUX 505 and Q-length comparator 104-1. Cell selector and comparator 117 (0) and cell selector and comparator 117 (1) are identical in structure and operation to cell selector and comparator 117, shown in FIG. 1 and described above. Thus, both cell selector and comparator 117 (0) and 117 (1) are supplied with outputs 114-1 from side 0 switch module 101 and 115-1 from side 1 switch module 102. Cell selector and comparator 117 (0) is responsive to a SEL 1 control signal from processor 510 to select either the signal on output 114-1 or the signal on output 115-1 to DEMUX 504. It is also operative to generate the out-of-synchronization indication signal OSC-1 (0) in the same manner as cell selector and comparator 117 of FIG. 1 described above. Side 0 DEMUX 504 is operative to demultiplex the signal supplied thereto from cell selector and comparator 117 (0) into M individual signals each having a rate which is 1/M of the signal supplied as an input thereto. These M signals are, in turn, supplied via outputs 511-1 through 511-M to cell selector and comparators 117-1 through 117-M. DEMUX 504 includes a plurality of M queues and the associated queue control circuitry (not shown). Q-length comparator 103-1 interacts with the M queues and associated Q control circuitry in DEMUX 504 to compare the lengths of the queues in DEMUX 504 and DEMUX 505. The structure and operation of Q-length comparator 103-1 is analogous to Q-length comparator 103 of FIG. 1 and described above. The only differences being that the number of queues being compared is M and they are operating at a bit rate which is 1/M of the bit rate of the signal being suppled to DEMUX 504. To this end, M Q-empty indications are supplied via M-lines 508 from Q-length comparator 103-1 to Q-length comparator 104-1 and vice-versa via M-lines 509. Thus, Q-length comparator 103-1 is operative to generate out-of-synchronization indicator signal OSQ-1 (0) which is supplied to processor 510. Similarly, cell selector and comparator 117 (1) is responsive to a SEL 1 control signal from processor 510 to select either the signal on output 114-1 or the signal on output 115-1 to DEMUX 505. It is also operative to generate the out-of-synchronization indication signal OSC-1 (1) in the same manner as cell selector and comparator 117 of FIG. 1 described above. Side 1 DEMUX 505 is operative to demultiplex the signal supplied thereto from cell selector and comparator 117 (1) into M individual signals each having a rate which is 1/M of the signal supplied as an input thereto. The M signals are, in turn, supplied via outputs 512-1 through 512-M to cell selector and comparators 117-1 through 117-M. DEMUX 505 includes a plurality of M queues and the associated queue control circuitry (not shown). Q-length comparator 104-1 interacts with the M queues and associated Q control circuitry in DEMUX 505 to compare the lengths of the queues in DEMUX 504 and DEMUX 505. The structure and operation Q-length comparator 104-1 is analogous to Q-length comparator 104 of FIG. 1 and described above. The only differences being that the number of queues being compared is M and they are operating at a bit rate which is 1/M of the bit rate of the signal being suppled to DEMUX 505. To this end, M Q-empty indications are supplied via M-lines 509 from Q-length comparator 104-1 to Q-length comparator 103-1 and vice-versa via M-lines 508, as indicated above. Thus, Q-length comparator 104-1 is operative to generate out-of-synchronization indicator signal OSQ-1 (1) which is supplied to processor 510. Each of cell selector and comparators 117-1 through 117-M is operative to select the corresponding output from either DEMUX 504 or DEMUX 505 to be supplied to line interface units 506-1 through 506-M, respectively. In turn, line interface units 506-1 through 506-M supply the selected signal to output lines 507-1 through 507-M. To this end, cell selector and comparators 117-1 through 117-M are responsive to a SEL 2 control signal supplied from processor 510 to select as an output either the signal supplied from side 0 DEMUX 504 or side 1 DEMUX 505 as an output to line interface units 506-1 through 506-M, respectively.. Additionally, cell selector and comparators 117-1 through 117-M are operative to generate out-of-synchronization indication signals OSC-I-1 through OSC-1-M. Again, cell selector and comparators 117-1 through 117-M are identical in structure and operation to cell selector and comparator 117 of FIG. 1 and described above, except they are operating at a bit rate which is 1/M of the bit rate of the signal being supplies as an input to output stage 501-1. Processor 510 is responsive to the out-of-sync indication signals, namely OSQ(0), OSQ (1), OSQ-1 (0) through OSQ-N (0), OSQ-1 (1) through OSQ-N ( 1 ), OSC-1 (0) through OSC-N (0), OSC-1 (1) through OSC-N (1) and the groups of OSC-1 (M) through OSC-N (M), where each of the OSC-1 (M) comprises the out-of-sync indication signals from cell selector and comparators 117-1 through 117-M in each of output stages 501-1 through 501-N, respectively. Otherwise, the operation of processor 510 can be similar to that of processor 123 of FIG. 1, described above.

Thus, in the multistage switch 500 of FIG. 5, it is seen that Q-length comparators 103 must exist on every pair of switch blocks that contains queues. Additionally, we also note that the cell comparison circuitry included in cell selector and comparators 117, must reside at the input of each stage that simultaneously receives as inputs the outputs from a side 0 switch module and a side 1 switch module from a previous stage.

In an ATM system the signal being supplied as an input to output stage 501-1 could be, for example, an STM-16 signal and the output signals could be M=16 STM-1 signals.

The above-described arrangements are, of course, merely illustrative of the application of the principles of the invention. Other arrangements may be devised by those skilled in the art without departing from the spirit or scope of the invention.

We claim:

1. A switch arrangement comprising:

a first duplicated switch stage and a plurality of second duplicated switch stages;

said first duplicated switch stage having a plurality of switch inputs, a first memory unit having a plurality of inputs, a plurality of outputs and a plurality of queues, individual ones of said plurality of queues for storing cells incoming on individual ones of the switch inputs and being destined for predetermined ones of said first memory unit outputs, a second memory unit having a plurality of inputs, a plurality of outputs and a plurality of queues, individual ones of said plurality of queues for storing cells incoming on individual ones of the switch inputs and being destined for predetermined ones of said second memory unit outputs, cells incoming on individual ones of the switch inputs being dual fed to individual ones of said first memory unit inputs and corresponding individual ones of said second memory unit inputs, individual ones of the plurality of first memory unit queues corresponding on a one-to-one basis to individual ones of the plurality of second memory unit queues and individual ones of the plurality of first memory unit outputs corresponding on a one-to-one basis to individual ones of the plurality of second memory unit outputs, wherein both said first memory unit and said second memory unit are operating simultaneously to store cells incoming on the plurality of switch inputs and both of said first and second memory units being synchronized with each other, first means for obtaining a plurality of first indications representative of the number of cells in the plurality of first memory unit queues, individual ones of said first indications corresponding on a one-to-one basis with individual ones of said plurality of first memory unit queues, second means for obtaining a plurality of second indications representative of the number of cells in the plurality of second memory unit queues, individual ones of said second indications corresponding on a one-to-one basis with individual ones of said plurality of first memory unit queues, and means for comparing individual ones of said first indications with individual ones of said second indications to determine whether there is any inequality in the number of cells in corresponding ones of said plurality of first memory unit queues and said plurality of second memory unit queues;

said plurality of second duplicated switches corresponding on a one-to-one basis with said plurality of first memory unit outputs and said corresponding plurality of second memory unit outputs, each of said plurality of second duplicated switches having first-and second inputs and a plurality of switch outputs, an output from said simultaneously operating first memory unit being supplied to one of said first and second inputs and a corresponding output from said simultaneously operating second memory unit being supplied to the other of said first and second inputs, and each of said second duplicated switches further including, first selection means responsive to a first control signal for selecting cells supplied to either said first input or said second input to be supplied as a first output, first comparator means for comparing contents of cells supplied to said first input and said second input to determine whether there is any inequality in the contents of said cells, second selection means responsive to said first control signal for selecting cells supplied to either said first input or said second input to be supplied as a second output, second comparator means for comparing contents of cells supplied to said first input and said second input to determine whether there is any inequality of said contents of said cells, first means having an input and a plurality of switch outputs and being supplied with said first selection means output for deriving a plurality of similar digital signals from the supplied first selection means output and including a plurality of first queues for storing said first means derived signals on a one-to-one basis, said plurality of first queues corresponding on a one-to-one basis with said plurality of switch outputs of said first means for deriving, second means having an input and a plurality of switch outputs and being supplied with said second selection means output for deriving a plurality of similar digital signals from the supplied second selection means output and including a plurality of second queues for storing said second means derived signals on a one-to-one basis, said plurality of second queues corresponding on a one-to-one basis with said plurality of switch outputs of said second means for deriving, first output stage means for obtaining a plurality of first queue indications representative of the number of cells in the plurality of first queues of said first means for deriving, individual ones of said first queue indications corresponding on a one-to-one basis with individual ones of said plurality of first queues of said first means for deriving, second output stage means for obtaining a plurality of second queue indications representative of the number of cells in the plurality of second queues of said second means for deriving, individual ones of said second queue indications corresponding on a one-to-one basis with individual ones of said plurality of second queues of said second means for deriving, output stage comparator means for comparing individual ones of said first queue indications with individual ones of said second queue indications to determine whether there is any inequality in the number of cells in corresponding ones of said plurality of first queues of said first means for deriving and said plurality of second queues of said second means for deriving, individual ones of said plurality of first means for deriving switch outputs corresponding on a one-to-one basis to individual ones of the plurality of switch outputs of said second means for deriving, and a plurality of output selector and comparator means corresponding on a one-to-one basis with said plurality of first means for deriving outputs and said corresponding plurality of said second means for deriving outputs and each of said plurality of output selector and comparator means having first and second inputs and an output, an output from said first means for deriving being supplied to one of said first and second inputs and a corresponding output from said second means for deriving being supplied to the other of said first and second inputs and including means responsive to a second control signal for selecting cells supplied to either said first input or said second input to be supplied to said switch output and means for comparing contents of cells supplied to said first input and said second input from said first means for deriving and said second means for deriving to determine whether there is any inequality of said contents of said cells; and the switch arrangement further including means for initiating resynchronization of said first memory unit, said second memory unit and said plurality of second switch stages in response to at least one indication of such an inequality.

2. A duplicate switch arrangement having a plurality of switch inputs and a plurality of switch outputs including a first memory unit having a plurality of inputs, a plurality of outputs and a plurality of queues, individual ones of said plurality of queues for storing cells incoming on individual ones of the switch inputs and being destined for predetermined ones of said first memory unit outputs, a second memory unit having a plurality of inputs, a plurality of outputs and a plurality of queues, individual ones of said plurality of queues for storing cells incoming on individual ones of the switch inputs and being destined for predetermined ones of said second memory unit outputs, cells incoming on individual ones of the switch inputs being dual fed to individual ones of said first memory unit inputs and corresponding individual ones of said second memory unit inputs and individual ones of the plurality of first memory unit outputs corresponding on a one-to-one basis to individual ones of the plurality of second memory unit outputs, wherein both said first memory unit and said second memory unit are operating simultaneously to store cells incoming on the plurality of switch inputs and both of said first and second memory units being synchronized with each other, the duplicated switch arrangement being characterized by, first means for obtaining a plurality of first indications representative of the number of cells in the plurality of first memory unit queues, individual ones of said plurality of first indications corresponding on a one-on-one basis with individual ones of said plurality of second memory unit queues, second means for obtaining a plurality of second indications representative of the number of cells in the plurality of second memory unit queues, individual ones of said second indications corresponding on a one-to-one basis with individual ones of said plurality of second memory unit queues, means for comparing individual ones of said first indications with individual ones of said second indications to determine whether there is any inequality in the number of cells in corresponding ones of said plurality of first memory unit queues and said plurality of second memory unit queues; and a plurality of output stages, each output stage having first and second inputs and a switch output, an output from said first memory unit being supplied to one of said first and second inputs and a corresponding output from said second memory unit being supplied to the other of said first and second inputs and including means responsive to a control signal for selecting cells supplied to either said first input or said second input to be supplied to said switch output, each of said output stages being including, means for comparing contents of cells supplied to said first input and said second input to determine whether there is any inequality of said contents of said cells; and the switch arrangement further including means for initiating resynchronization of said first memory unit and said second memory unit when the results of said comparing in said output stages indicates at least one such inequality from said plurality of output stages or when the results of comparing the first indications and the second indications indicates at least one such inequality from said in-service memory units.

* * * * *